(12) United States Patent
Karamchedu et al.

(10) Patent No.: US 7,461,397 B2
(45) Date of Patent: Dec. 2, 2008

(54) CUSTOMIZED ELECTRONIC MESSAGING

(75) Inventors: Murali M. Karamchedu, Beaverton, OR (US); Jeffrey B. Sponaugle, Hillsboro, OR (US)

(73) Assignee: Kryptiq Corporation, Hillsboro, OR (US)

( * ) Notice: Subject to any disclaimer, the term of this patent is extended or adjusted under 35 U.S.C. 154(b) by 0 days.

(21) Appl. No.: 10/753,983

(22) Filed: Jan. 5, 2004

(65) Prior Publication Data

US 2004/0201625 A1 Oct. 14, 2004

Related U.S. Application Data

(60) Provisional application No. 60/437,768, filed on Jan. 3, 2003.

(51) Int. Cl.
 *G06F 7/04* (2006.01)
 *G06F 15/16* (2006.01)

(52) U.S. Cl. ............... 726/6; 726/2; 726/21; 709/206; 709/207

(58) Field of Classification Search ............... 713/100, 713/150, 154, 156, 158–173, 176, 180–186, 713/201, 202; 380/258, 277, 278; 707/3–5, 707/7, 9, 102; 709/200, 219, 237, 238
See application file for complete search history.

(56) References Cited

U.S. PATENT DOCUMENTS 6,108,691 A * 8/2000 Lee et al. ............... 709/206
6,249,805 B1 * 6/2001 Fleming, III ............ 709/206
6,389,455 B1 * 5/2002 Fuisz .................... 709/206
6,473,758 B1 * 10/2002 Schwartz et al. ........... 707/9
7,139,825 B2 * 11/2006 Andaker et al. .......... 709/225
2001/0049723 A1 * 12/2001 Dean .................... 709/206
2001/0049745 A1 * 12/2001 Schoeffler ............... 709/238
2002/0016824 A1 * 2/2002 Leeds ................... 709/207
2002/0138581 A1 * 9/2002 MacIntosh et al. ........ 709/206
2002/0169840 A1 * 11/2002 Sheldon et al. ........... 709/206
2002/0174363 A1 * 11/2002 Chefalas et al. ........... 713/201
2004/0030893 A1 2/2004 Karamchedu et al.
2004/0030916 A1 2/2004 Karamchedu et al.
2004/0030917 A1 2/2004 Karamchedu et al.
2004/0030918 A1 2/2004 Karamchedu et al.
2004/0054744 A1 3/2004 Karamchedu et al.

OTHER PUBLICATIONS http://dictionary.com.reference.com/search?q=transaction (last visted: Apr. 4, 2005).*

* cited by examiner

*Primary Examiner*—KimYen Vu
*Assistant Examiner*—Ponnoreay Pich
(74) *Attorney, Agent, or Firm*—Schwabe, Williamson & Wyatt, P.C.

(57) ABSTRACT

Methods and apparatuses for customized electronic messaging are described. In one embodiment, a customized email address is dynamically generated based at least in part upon a custom address profile so as to be particularized to the recipient. An email message addressed to the recipient using the customized email address is received from a sending party, and a disposition for the email message is determined based upon either the custom address profile and/or the customized email address.

18 Claims, 6 Drawing Sheets

| Contact Names/ Domains | Accept From | Reject All | Limit Sender Messages | Max # Msg's | Accept Until Date |
|---|---|---|---|---|---|
| Bob | ☒ | ☐ | ☐ | N/A | |
| Amazon.com | ☒ | ☐ | ☒ | 10 | |
| spammail.com | ☐ | ☒ | ☐ | N/A | |
| ABC Electric | ☒ | ☐ | ☒ | | 1/31/02 |

Global Address Expiration Date?  Y ○  N ●

| Custom Email Address | Actual Email Address |
|---|---|
| Bill_subscriptions@home.com | Bill_Smith@home.com |
| Bill@ezregistrations.com | Bill_Smith@home.com |
| 1245#q63015bef30@home.com | Bill_Smith@home.com |

CUSTOMIZED ELECTRONIC MESSAGING

RELATED APPLICATIONS

This application claims priority to provisional application Ser. No. 60/437,768 filed on Jan. 3, 2003 and entitled "TRANSACTIONAL AND CONSTRAINT BASED EMAIL".

TECHNICAL FIELD

The present invention pertains to the field of electronic messaging, and in particular, to a system and method for generating transactional and constraint based email addresses.

BACKGROUND INFORMATION

As the number of people who have email accounts continues to increase at a near exponential rate, so too does the number of unsolicited email messages received by the average person each day. Whether the unsolicited email messages originate from companies with which a particular end user has previously conducted business, or from companies that are generally unknown to the end user, the result is the same. That is, unsolicited messages frequently result in decreased end user productivity and increased transaction costs for the user or user's employer.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Overview

Figure 1:
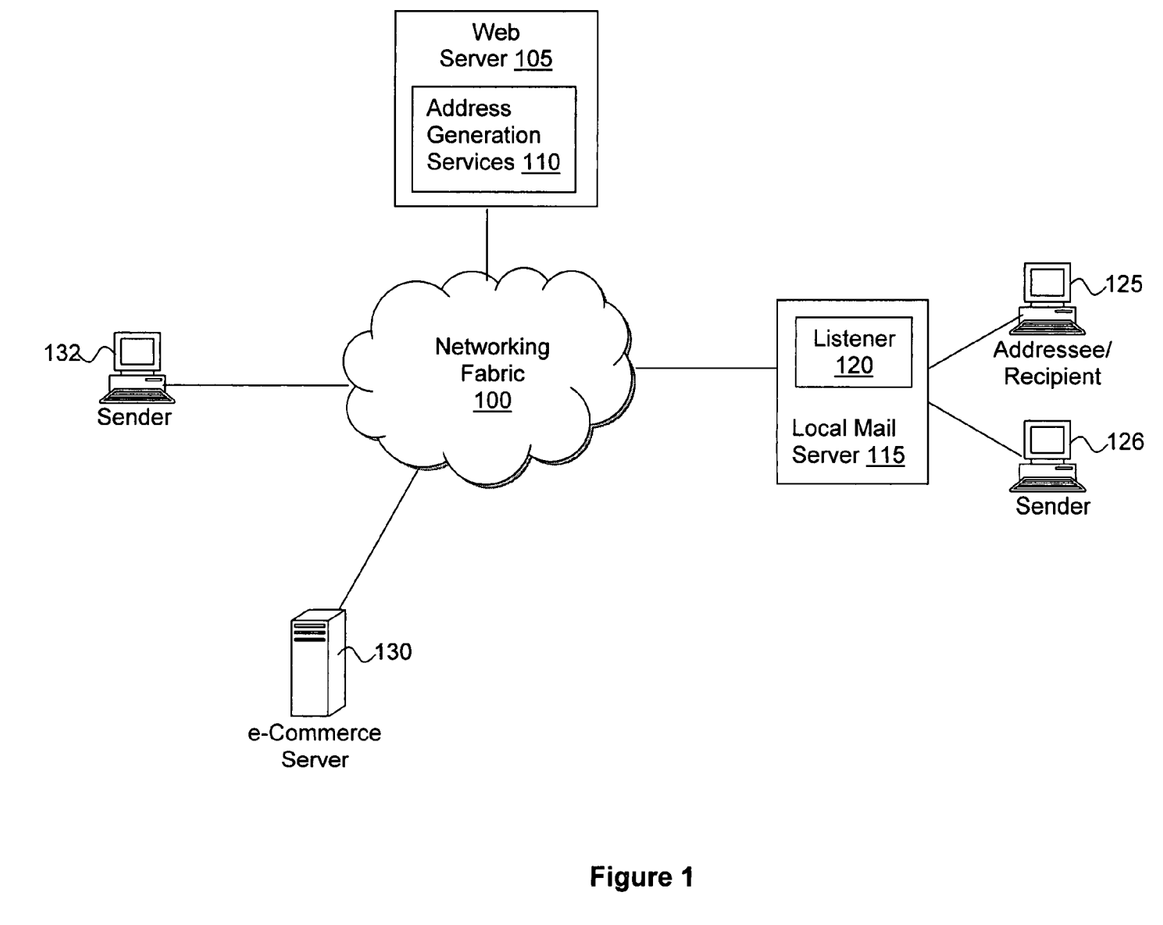
FIG. 1 illustrates an overview of one environment for transactional and constraint based email address generation in accordance with one embodiment of the invention.

FIG. 1 illustrates an overview of an environment for transactional and constraint based email address generation in accordance with one embodiment of the invention. Web server 105, local mail server 115, e-commerce server 130, and sender 132 are communicatively coupled to networking fabric 100 as shown, where networking fabric 100 may represent one or more interconnected data networks, such as, but not limited to the Internet or World Wide Web.

Web server 105 represents a device configured to deliver or provide web pages and/or web services to one or more requesting devices communicatively coupled to networking fabric 100. In one embodiment, web server 105 is equipped with address generation services 110 to facilitate in the generation of transactional and/or constraint based email addresses. In one embodiment of the invention, transactional email addresses are transitory in nature in that they are generated for the purpose of completing one or more transactions and when the transaction(s) is(are) complete, the email address is inactivated. In one embodiment, constraint based email addresses represent email addresses whose use has been conditioned subject to one or more constraints/rules that have been associated with the email address. Transactional email addresses need not necessarily be associated with one or more constraints, but they may. Similarly, constraint based email addresses need not necessarily be transactional email addresses, although they may. In one embodiment, address generation services 110 represents a web service through which devices such as senders 132, 126 and/or addressee/recipient 125 may cause address generation services 110 to generate one or more transactional and/or constraint based email addresses (hereinafter cumulatively referred to as "custom" email addresses).

Local mail server 115 represents a computing device equipped with electronic mail services (such as Exchange available from Microsoft Corporation or Lotus Notes available from International Business Machines Corporation) to facilitate in the generation and/or delivery of electronic mail messages on behalf of local clients such as addressee/recipient 125 and sender 126. In one embodiment, local mail server is equipped with listener 120 to detect receipt of one or more messages addresses to one or more custom email addresses.

Figure 2:
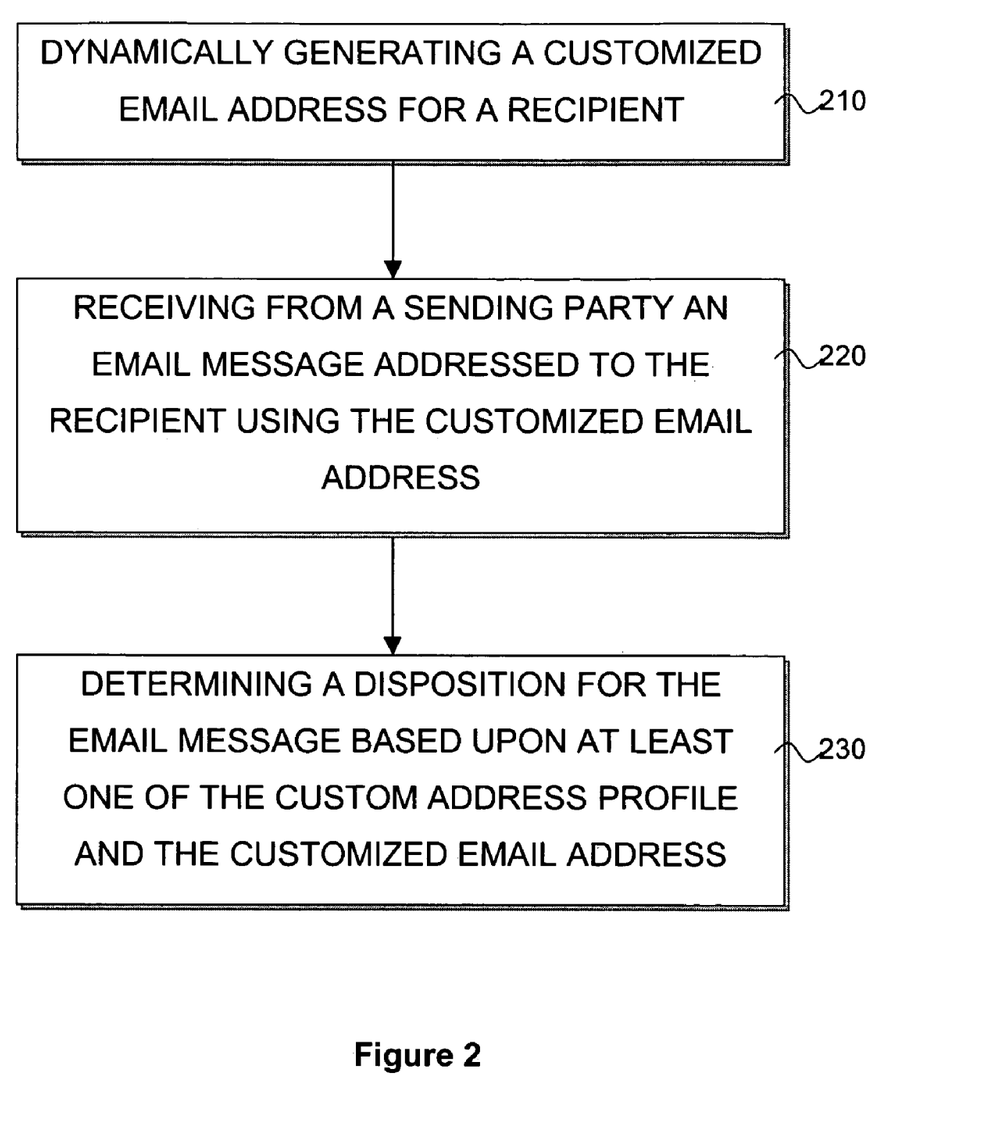
FIG. 2 is a flow diagram illustrating an overview of one embodiment of the invention.

FIG. 2 is a flow diagram illustrating an operational flow in accordance with one embodiment of the present invention. As shown, a customized email address particularized to a recipient is dynamically generated based at least in part upon a custom address profile (block 210). Thereafter, an email message addressed to the recipient using the customized email address is received from a sending party (block 220). Lastly, a disposition for the email message is determined based upon either the custom address profile and/or the customized email address (block 230). In one embodiment, one or more devices illustrated in FIG. 1 may perform all or a portion of the operational flow described with respect to FIG. 2.

Address Generation

In one embodiment of the invention a holder of an email account on local email server 115, such as addressee/recipient 125, may access address generation services 110 to provide/configure a custom email address profile to be used in the generation of one or more custom email addresses to be associated with the account holder. Although in the illustrated embodiment addressee/recipient 125 may access address generation services 110 of web server 105 through a web interface via networking fabric 100, addressee/recipient 125 may also access the address generation services via a localized intranet, or through software executing locally on local mail server 115 or on the client of addressee/recipient 125.

Figure 3:
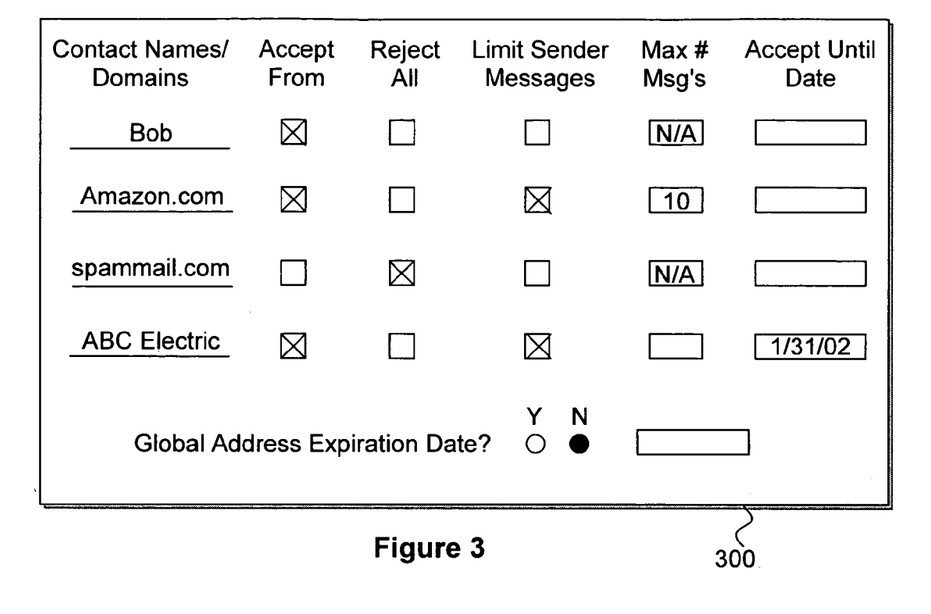
FIG. 3 illustrates an example custom email address profile entry form, in accordance with one embodiment of the invention, to facilitate in the generation of a transactional and/or constraint based email address.

FIG. 3 illustrates an example custom email address profile form to facilitate in the generation of a transactional and/or constraint based (i.e. custom) email address, in accordance with one embodiment of the invention. Form 300 may be utilized by, for example, an email account holder such as addressee/recipient 125 or a designee in configuring behavioral aspects of a custom email address hosted e.g. by local mail server 115. As shown, form 300 includes a variety of configuration options to customize the limited (whether temporal or functional) nature of such a custom email address. For example, form 300 includes facilities to designate whether any email messages should be accepted (i.e. routed to the associated addressee/recipient), from whom the messages are allowed to be accepted, the number of messages that may be accepted from each sender (whether on an individual, group, or domain name basis), the cumulative number of messages that may be accepted from all senders, an expiration date after which no messages will be accepted from a particular user/group/domain, a global expiration date after which no messages will be accepted from any user/group/domain, and so forth. Although not shown, form 300 or equivalent email customization mechanism, may include additional dynamic or manual configuration options such as facilities to specify the time duration (e.g. hour, day, week, month, year . . . etc.) according to which the maximum number of messages that may be accepted is to be determined.

Figure 4:
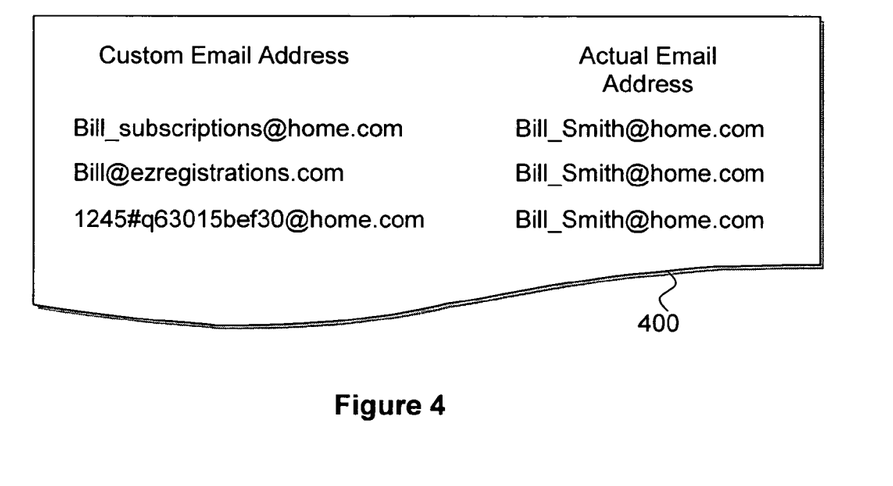
FIG. 4 illustrates an example data structure by which transactional and/or constraint based email addresses may be associated with actual (i.e. mail server assigned) email addresses, in accordance with one embodiment of the invention.

FIG. 4 illustrates an example data structure by which custom email addresses may be associated with actual (i.e. mail server-controlled) email addresses, in accordance with one embodiment of the invention. In one embodiment, table 400 functions as a lookup table that maps each custom email address to its actual server-assigned email address analog. In one embodiment, each actual email address may be associated with multiple custom email addresses, whereas each custom email address is associated with a single actual email address. By making such a custom email address available to the public rather than a recipient's actual email address, the recipient's actual email address may remain shielded from the public, thereby potentially decreasing the amount of unsolicited email or SPAM received by the recipient. Moreover, depending upon the various constraints placed on a custom email address, a recipient may designate how one or more email messages addressed to the recipient (e.g. via the custom email address) may be handled prior to the recipient actually receiving the email message. Furthermore, a recipient may use or provide custom email addresses in lieu of their actual email address when e.g. electronically transacting business with e-commerce server 130, providing "personalized" electronic registration information requested by one more web pages, or upon request by certain individuals not well-known by the recipient. Accordingly, both prospective senders as well as the recipient/email account holders themselves may request the custom email addresses described herein.

Sender Requested Address

As alluded to above in accordance with one embodiment of the invention, the sender of an email message may request a custom email address before or during the message sending process.

In one embodiment a sender may request a transactional and/or constraint based email address, prior to their sending a message to a recipient. For example, a sender may select a recipient by accessing a web page hosted by e.g. web server 105 that advertises the name(s) or nickname(s) of one or more potential recipients. In one embodiment, web server 105 may dynamically generate (or cause to have generated) a custom email address for the indicated recipient, based e.g. upon a custom email address profile previously generated by the recipient account holder. In another embodiment, web server 105 may merely identify a previously generated custom email address in response to the sender's request. In turn, web server 105 may then return the custom email address to the requesting sender.

In one embodiment a sender may request a transactional and/or constraint based email address as part of the message sending process. For example, after composing an email message, a sender may select the "send" button on the sender's email client which, in turn, causes the email client to initiate a connection with a server equipped with address generation services of the present invention to request a custom email address. The sender may then be presented with a list of available/applicable recipient names or nicknames, from which the sender may select the appropriate message recipients. In response to the sender's selection, the server equipped with the address generation services may return the appropriate custom email address to the sending email client, which then inserts the generated address into the message header, and routes the message to the appropriate outgoing mail server.

Addressee/Recipient Requested Address

In one embodiment, the email account holder for whom the custom email address will be associated (i.e. the "addressee/recipient" of an eventual email message) may be the one to request that the custom email address be generated. Once the custom email address has been generated based upon e.g. a previously created custom email address profile, the client may freely distribute the generated custom email address to one or more potential senders for use by the senders in addressing future email messages to the addressee/recipient. Through the provision of such generated custom email addresses, an email account holder can influence the quantity, type and disposition of future email messages addressed to the account holder as a recipient. For example, an email account holder could provide a custom transactional email address to an on-line merchant during a pre-purchase on-line registration process. Furthermore, the custom transactional address may be associated with an expiration date after which the custom transactional email address will be invalid, or with a limitation as to the number of messages that may be received from the merchant, and so forth. By providing the on-line merchant with the transactionally generated custom email address, the email account holder is able to proactively manage their email account. In one embodiment, an addressee/recipient having access to address generation services 110 may tailor the email address profile associated with the custom email address before as well as after the custom email address has been generated.

Example Address Generation Process

In one embodiment, a host web server, such as web server 105 equipped with address generation services 110, dynamically generates a custom email address based upon e.g. a custom email address profile previously generated by the recipient account holder (independent of whether the profile is stored on the host web server, a local mail server, or another device). In another embodiment, the host web server may instead cause another device equipped with address generation services, such as local mail server 115, to generate the custom email address.

In one embodiment, the transactional and/or constraint based email address generation process begins with address generation services 110 receiving a request from a sending client to generate the transactional and/or constraint based email address. The request may take a number of forms including, but not limited to an HTTP request including a URI/URL indicating address generation services 110. Upon receiving the request, address generation services 110 may, in turn, generate an appropriate custom email address based upon one or more constraint criteria as e.g. provided by a custom email address profile. In one embodiment, the transactional and/or constraint based email address may be selected or generated based upon one or more characteristics of the sender or sending client. For example, the network domain or the username for the generated custom email address may be varied based upon the identity of the sender or network domain of the sending client. Thus, in response to an email address request, a reputable on-line merchant may be returned a custom email address having a dynamically generated username along with the actual network domain of the addressee/recipient. In contrast, a questionable merchant may be provided with a completely randomized username in addition to an aliased network domain.

In one embodiment, custom email addresses are generated so as to include encoded or non-encoded representations of the various criteria from the custom email address profile. For example, if the reputable on-line merchant described above requests an email address for an addressee/recipient, a custom email address having a username beginning with the three-digit number combination "124" may be generated to indicate that email messages may be accepted from this particular sender (or any sender given an email address beginning with this number combination.) In contrast, if a questionable merchant that is known to deliver large numbers of unsolicited email messages requests an email address for an addressee/recipient, a custom email address having a username beginning with the three-digit number combination "123" may be generated to indicate that no email messages are to be accepted from this particular sender.

In one embodiment, address generation services 110 may optionally require that the requesting sender be authenticated prior to generating a requested custom email address. To this end, address generation services 110 may require a valid digital certificate from the requesting sender, or may require that the requesting sender authenticate himself or herself through a web interface. For example, in response to a received request, address generation services 110 may return an HTML based form that requests the sender to enter some authenticating information to be submitted to address generation services 110. Upon receipt of valid or verified information provided by the sender, address generation services 110 may in turn generate the requested custom email address. In one embodiment, address generation services 110 selects/generates the transactional and/or constraint based email address as reflective of the outcome of the authentication process.

Once the transactional and/or constraint based email address has been generated, or selected from one or more previously generated addresses, a mapping is created between the custom address and the addressee/recipient's actual address (as shown e.g. in FIG. 4) and the address is returned to the requestor. In the event address generation services 110 are located on web server 105, the email address mapping may reside on local server 115 as a result of back-channel communications between web server 105 and local mail server 115.

Address Listener

In one embodiment of the invention, a mail server (e.g. local mail server 115) is equipped with listening services (e.g. listener 120) to detect the receipt of mail messages addressed to a custom email address generated in accordance with the teachings of the present invention. In one embodiment, listener 120 monitors one or more network port such as port 25 (corresponding to SMTP) to detect incoming email messages addressed to one or more network email domains serviced by the associated mail server. In one embodiment, listener 120 detects email messages addressed to custom email addresses generated by e.g. address generation services 110. In one embodiment, upon detecting an incoming email message on a listened port, listener 120 accesses a data structure, such as table 400 of FIG. 4, to determine whether the incoming message is addressed to a known custom email address. If listener 120 determines that the incoming message is not addressed to a custom email address, but is instead addressed to an actual email address native to local mail server 115, listener 120 merely passes the message to local mail server 115 without further processing. However, if listener 120 determines that the incoming message is addressed to a custom email address listener 120 applies one or more filtering rules/constraints as may be associated with the custom email address.

In one embodiment, upon determining that the incoming message is addressed to a custom email address, listener 120 determines whether the sender is a qualified sender. To be qualified, the sender may be required to possess a valid digital certificate, or may be required to authenticate himself or herself. For example, in response to a received request, listener 120 may email to the sender, an HTML based form requesting the sender to provide authentication information such as a password to be submitted to listener 120. Similarly, to become qualified, the sender may merely be required to indicate that they are not an automated mass mailer by providing the simplest of responses to the listener, thus eliminating a large number of "junk" email messages.

In one embodiment, once it is determined that the incoming message is addressed to a custom email address, listener 120 further determines whether the custom email address is associated with an expiration date for incoming messages (whether globally or limited to certain messages). For example, if it is determined that an expiration date associated with a custom email address has passed, the email address may be deactivated or destroyed. In one embodiment, a custom email address may be deactivated or destroyed by removing the mapping between the generated email address and the addressee/recipient's corresponding actual email address.

Figure 5:
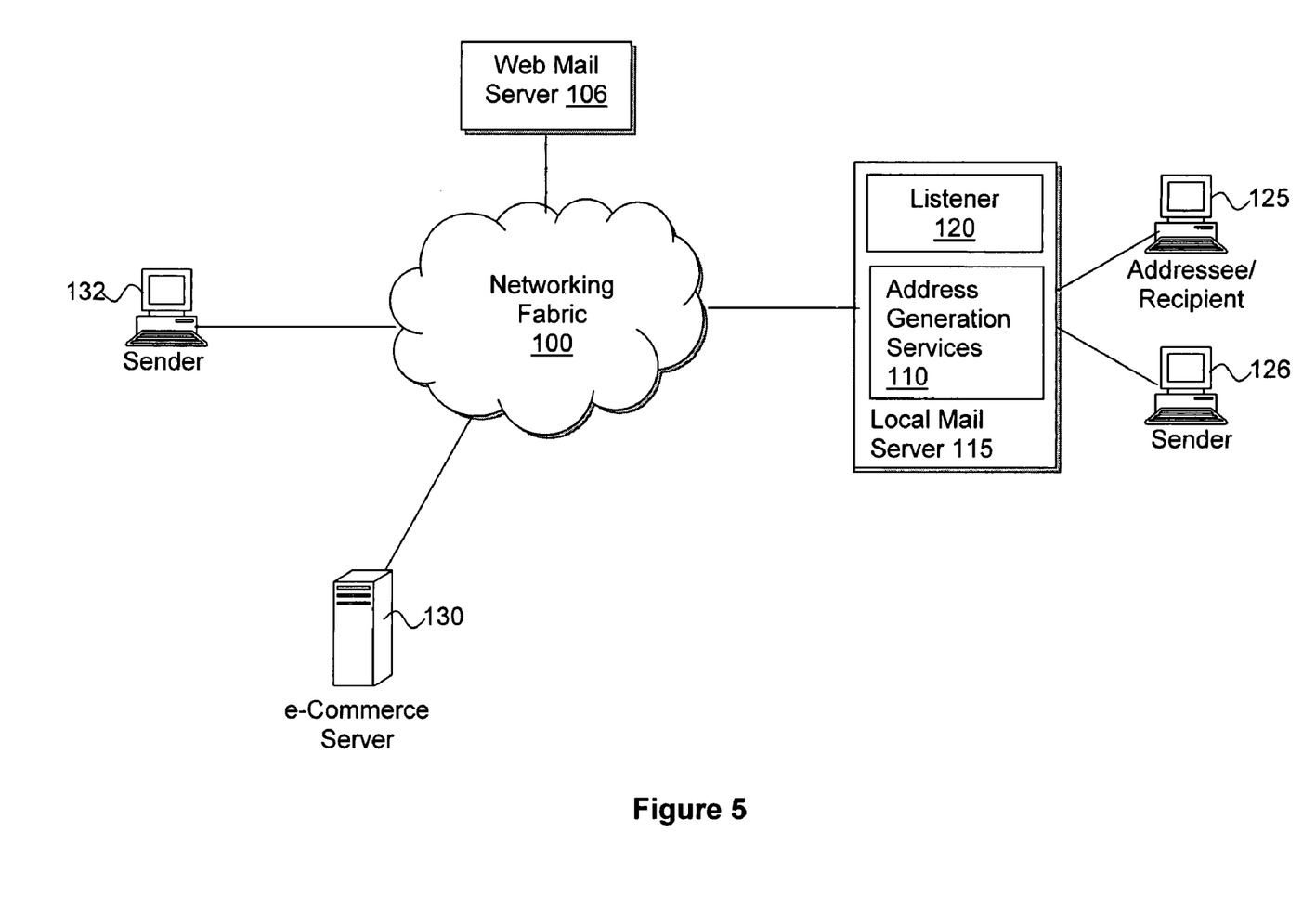
FIGS. 5 and 6 each illustrate an environment for transactional and constraint based email address generation in accordance with two embodiments of the invention.
Figure 6:
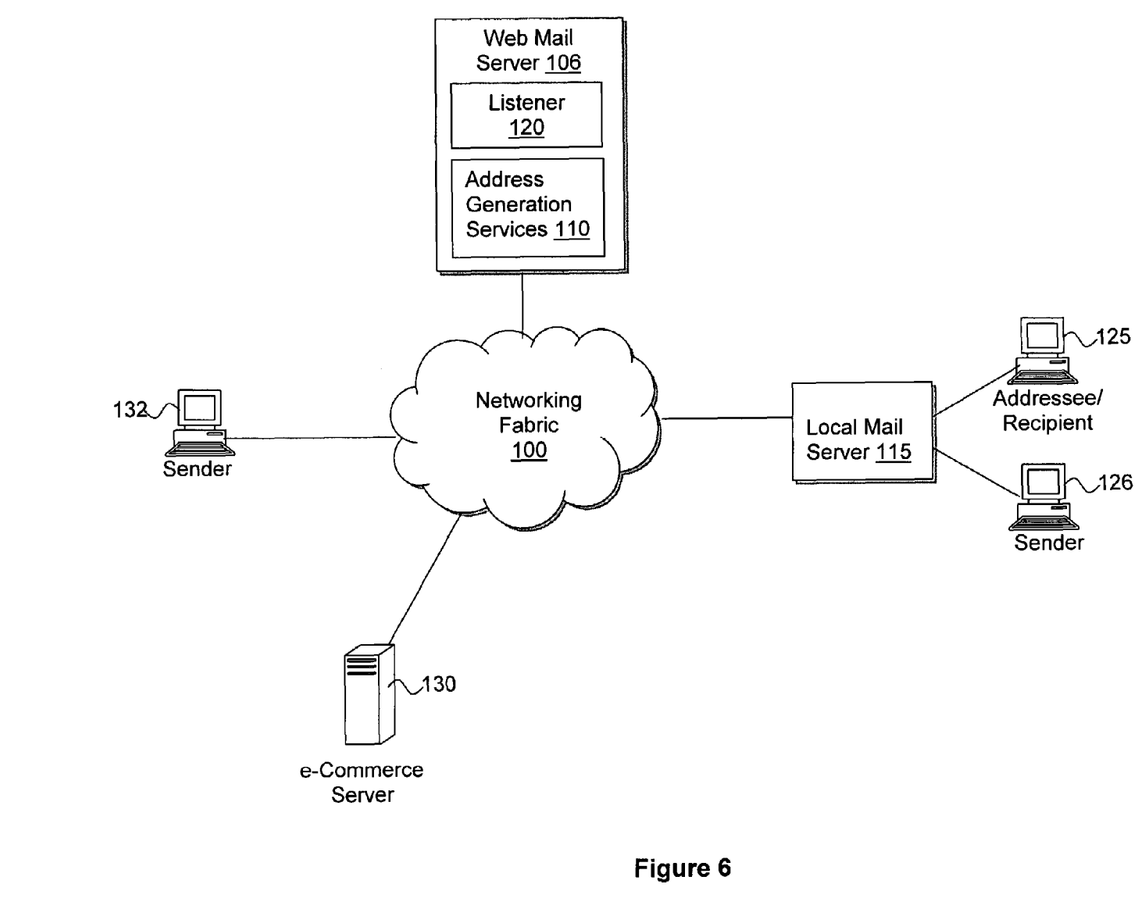

FIGS. 4 and 5 illustrate an environment for custom email address generation in accordance with two additional embodiments of the invention. In the illustrated embodiment of FIG. 5, local mail server 115 is equipped with listener 120 as well as address generation services 110. Furthermore, web mail server 105 has been replaced by web server 106. Web mail server 106 represents a $3^{rd}$ party web-based email service such as HOTMAIL or YAHOO! that provides subscription based email accounts to subscribers. With such subscription based email accounts, electronic mail messages may be stored on a remote $3^{rd}$ party server and viewed by respective recipients through the use of a web browser or by download to a local mail server using e.g. the well-known Post Office Protocol (POP) version 3 as described in Request for Comments (RFC) 1939. Using a protocol such as POP3, local mail server 115 may retrieve one or more email messages from web mail server 106 on behalf of addressee/recipient 125. In one embodiment, web based email messages received by, and stored on web mail server 106 and addressed to a particular subscriber, are retrieved by local mail server 115 where they are inspected or listened to, to determine whether the email address of a message's designated recipient is a custom email address. FIG. 6 illustrates an embodiment of the present invention where web mail server 106 is equipped with both address generation services 110 as well as listener 120. In such an embodiment, the $3^{rd}$ party email server may listen for email messages having a recipient email address that is a custom email address.

Figure 7:
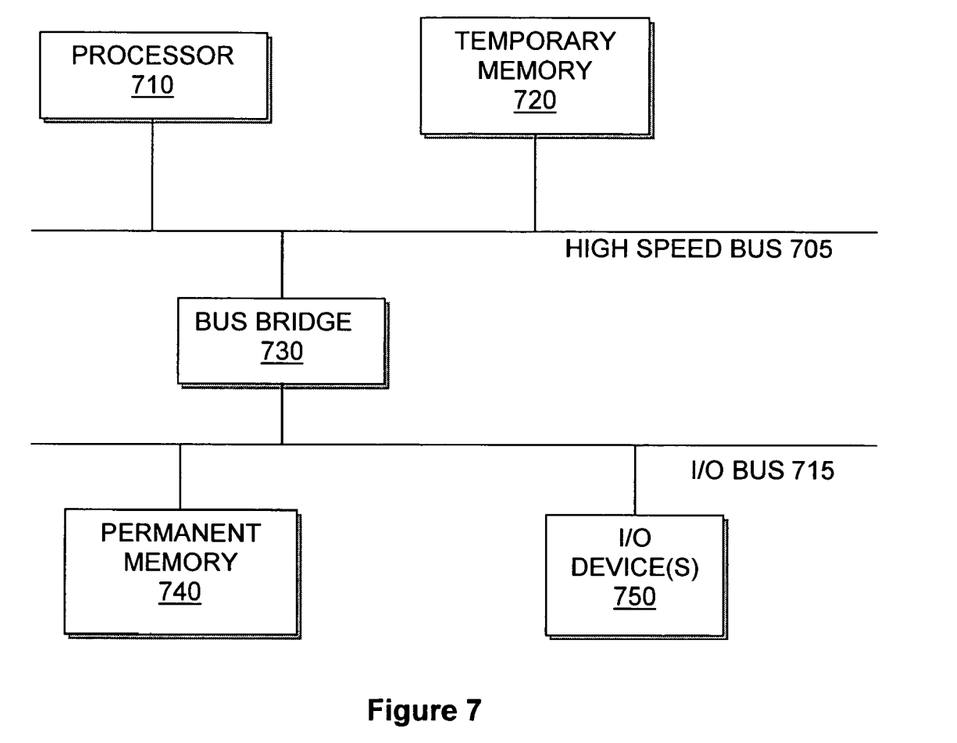
FIG. 7 illustrates one embodiment of a hardware system to implement embodiments of the present invention.

FIG. 7 illustrates one embodiment of a hardware system intended to represent a broad category of computing devices such as, but not limited to a local mail server, a web server, a web-based email server and a sender capable of hosting address generation services and/or listening services of the present invention. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. I/O device(s) 750 is also coupled to bus 715. I/O device(s) 750 may include a display device, a keypad/keyboard, an antenna, radio frequency transponder, one or more external accessory interfaces, etc.

Certain embodiments may include additional components, may not require all of the above components, or may combine one or more components. For instance, temporary memory 720 may be on-chip with processor 710. Alternately, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, digital signal processors (DSPs), additional memories, and other peripheral components known in the art.

In one embodiment, the present invention, as described above, is implemented using a hardware system such as the hardware system of FIG. 7. In one embodiment, the present invention is implemented as software routines executed by one or more execution units within one or more computing devices. For a given computing device, the software routines can be stored on a storage device, such as permanent memory 740.

Figure 8:
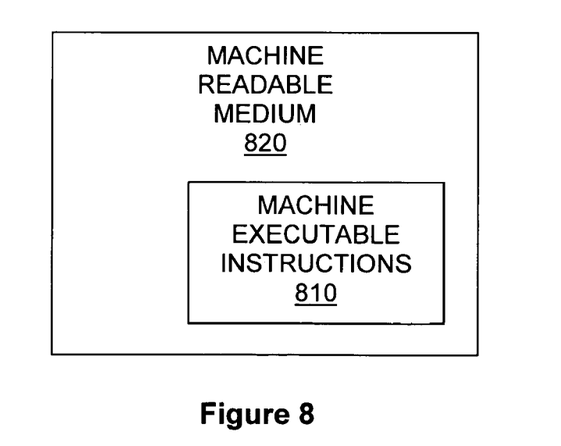
FIG. 8 illustrates one embodiment of a machine-readable medium to store executable instructions for embodiments of the present invention.

Alternatively, as shown in FIG. 8, the software routines can be machine executable instructions 810 stored using any machine readable storage medium 820, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 750 of FIG. 7.

From whatever source, the instructions may be copied from the storage device into temporary memory 720 and then accessed and executed by processor 710. In one implementation, these software routines are written in the C programming language. It is to be appreciated, however, that these routines may be implemented in any of a wide variety of programming languages.

In other embodiments, the present invention is implemented in discrete hardware or firmware. For example, one or more application specific integrated circuits (ASICs) could be programmed with one or more of the above-described functions of the present invention. In another example, one or more functions of the present invention could be implemented in one or more ASICs on additional circuit boards and the circuit boards could be inserted into the hardware system described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, transactional and constraint based (i.e. custom) email addresses have been described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method for electronic messaging comprising:
a computing device receiving a request from a first party user to generate a customized electronic mail address for a second party user, for use by the first party user as a destination address to electronically mail messages to the second party user, the first and second parties being different parties;
generating by the computing device, upon receipt of the request from the first party, the requested customized electronic mail address for the second party user; and
providing by the computing device, the generated customized electronic mail address to the first party user for subsequent use by the first party user;
wherein content of the customized electronic mail address is particularized based at least in part upon a reputation of the first party user and a custom address profile applicable to the second party user.

2. The method of claim 1, wherein the customized electronic mail address includes or is associated with one or more constraints from the custom address profile.

3. The method of claim 2, wherein the one or more constraints from the custom address profile comprise an encoded representation of a transactional constraint indicating one or more transactions for which the customized electronic mail address may be used prior to inactivation of the customized electronic mail address.

4. The method of claim 2, wherein the one or more constraints indicate one or rules for use by a filtering device for disposition of an electronic message received by the filtering device form the first party user.

5. The method of claim 4, wherein the filtering device disposes of the electronic message by determining whether the electronic message is to be delivered to the second party user or whether the electronic message is to be blocked from being delivered to the second party user.

6. The method of claim 1, wherein the customized electronic mail address is further particularized based on one or more characteristics of the second party user including at least one of the second party's party user's identity and a network domain of the second party user.

7. The method of claim 1, wherein the custom address profile is specified by the second party user.

8. The method of claim 1, wherein the custom address profile specifies a time period after which all messages originating from the first party user are to be blocked.

9. The method of claim 1, wherein the custom address profile specifies a maximum number of messages addressed from the first party user using the customized electronic mail address that may be sent by the first party user.

10. A computing device comprising:
a storage medium having stored therein a plurality of programming instructions that enables the computing device to determine whether a received electronic message sent from a second party user to a first party user was sent using a customized electronic mail address as a source address to identify the second party user as a sender, and further enables the computing device to determine whether the customized electronic mail address was generated by an address service for the second party user upon receipt of a request from the first party user requesting generation of the customized electronic mail address for the second party user, content of the customized electronic mail address particularized based at least in part upon a reputation of the first party user and a custom address profile applicable to the second party user, and the first and second parties being different parties; and
a processor coupled to the storage medium to execute the programming instructions.

11. The computing device of claim 10, wherein the plurality of programming instructions are further designed to enable the computing device to determine disposition of the received electronic message based on an encoded representation included in the customized electronic mail address if the received electronic message is determined to be sent using the customized electronic mail address as a source address to identify the second party user as a sender, the encoded representation indicating one or more disposition rules.

12. The computing device of claim 10, wherein the plurality of programming instructions further enables the computing device to determine disposition of the received electronic message based on an encoded representation included in the customized electronic mail address if the received electronic message is determined to be sent using the customized electronic mail address as a source address to identify the second party user as a sender, the encoded representation indicating one or more disposition rules from the custom address profile.

13. The computing device of claim 10, wherein the plurality of programming instructions further enables the computing device to determine disposition of the received electronic message based on an encoded representation included in the customized electronic mail address if the received electronic message is determined to be sent using the customized electronic mail address as a source address to identify the second party user as a sender, the encoded representation indicating one or more disposition rules and comprising an encoded representation of a transactional constraint indicating one or more transactions for which the customized electronic mail address may be used prior to inactivation of the customized electronic mail address.

14. A system comprising:
a first computing device having a first storage medium having stored therein a first plurality of programming instructions and a first processor coupled to the first storage medium to execute the first programming instructions, the first plurality of programming instructions enabling the first computing device to:
receive a request from a first party user to generate a customized electronic mail address for a second party user, for use by the first party user as a destination address to electronically mail messages to the second party user, and the first and second parties being different parties;
to generate, upon receipt of the request from the first party user, the requested customized electronic mail address for the second party user; and
to provide the customized electronic mail address to the first party user for use by the first party user, wherein content of the customized electronic mail address is particularized based at least in part upon a reputation of the first party user and a custom address profile applicable to the second party user; and
a second computing device having a second storage medium having stored therein a second plurality of programming instructions and a second processor coupled to the second storage medium to execute the second programming instructions, the second plurality of programming instructions enabling the second computing device to determine whether a received electronic message sent from the second party user to the first party user was sent using the customized electronic mail address as a source address to identify the second party user as the sender.

15. The system of claim 14, wherein the customized electronic mail address includes an encoded representation of one or more constraints from the custom address profile, the one or more constraints indicate one or more rules for disposition of an electronic message received from the second party user.

16. The system of claim 15, wherein the second plurality of programming instructions further enables the second computing device to determine disposition of the received electronic message based on the encoded representation included in the customized electronic mail address if the received electronic message is determined to be sent using a customized electronic mail address as a source address to identify the second party user as the sender.

17. The system of claim 15, wherein the encoded representation of a constraint from the custom address profile comprises an encoded representation of a transactional constraint indicating one or more transactions for which the customized electronic mail address may be used prior to inactivation of the customized electronic mail address.

18. The system of claim 14, wherein the customized electronic mail address is further particularized based on one or more characteristics of the second party user including at least one of the second party user's identity and a network domain of the second party user.

* * * * *